United States Patent [19]
VanName et al.

[11] Patent Number: 5,369,955
[45] Date of Patent: Dec. 6, 1994

[54] GAS GENERATOR AND METHOD FOR MAKING SAME FOR HAZARD REDUCING VENTING IN CASE OF FIRE

[75] Inventors: Frederick W. VanName; Victor Singer, both of Newark, Del.

[73] Assignee: Thiokol Corporation, Del.

[21] Appl. No.: 557,920

[22] Filed: Jul. 25, 1990

[51] Int. Cl.$^5$ .............................. F02K 9/00
[52] U.S. Cl. ................... 60/253; 60/39.091; 102/202.1; 102/481
[58] Field of Search ............ 60/39.091, 253, 255; 102/481, 202.1; 280/736

[56] References Cited

U.S. PATENT DOCUMENTS

| | | | |
|---|---|---|---|
| 2,995,011 | 8/1961 | Kimmel | 60/255 |
| 3,017,746 | 1/1962 | Kiphart | 60/255 |
| 3,084,506 | 4/1963 | Floyd et al. | 60/39.091 |
| 3,224,317 | 12/1965 | Gould | 60/255 |
| 3,263,613 | 8/1966 | Rice et al. | 60/255 |
| 3,745,927 | 7/1973 | Tanner et al. | 102/531 |
| 4,041,869 | 8/1977 | San Miguel | 102/481 |
| 4,411,199 | 10/1983 | Yates et al. | 102/481 |
| 4,443,666 | 4/1984 | Vetter | 60/253 |
| 4,458,482 | 7/1984 | Vetter et al. | 102/481 |
| 4,838,166 | 6/1989 | Spies et al. | 102/481 |
| 5,060,470 | 10/1991 | VanName | 102/481 |

*Primary Examiner*—David Brown
*Attorney, Agent, or Firm*—Ronald L. Lyons; Kendrew H. Colton

[57] ABSTRACT

A rocket motor or other gas generator the case of which is ventable at a predetermined temperature substantially greater than the ambient temperature range for storage and operation thereof and substantially less than the auto-ignition temperature of gas generant material contained therein so as to prevent catastrophic propulsion or burst in case of fire. In order to provide such venting without requiring any shaped charges or other auxiliary system for that purpose at all, the case is composed of a matrix-impregnated fibrous material wherein the fibrous material is characterized by having a melting point which is substantially higher than the ambient temperature range and which is substantially lower than the auto-ignition temperature of the gas generant material. The matrix material is preferably actinic radiation-curable at a temperature which is substantially lower than the melting point temperature of the fibrous material. The case may preferably be composed of polyolefin fibrous material impregnated with an ultraviolet light-curable radiation.

27 Claims, 2 Drawing Sheets

GAS GENERATOR AND METHOD FOR MAKING SAME FOR HAZARD REDUCING VENTING IN CASE OF FIRE

The present invention relates generally to rocket motors and other gas generators. More particularly, the present invention relates to gas generators which have composite cases, i.e., cases which are composed of a fibrous material which is impregnated with a resin or other matrix material. While the present invention is described herein with respect to rocket motors, it should be understood that other kinds of gas generators are meant to come within the scope of the present invention.

The burning of a propellant material within a rocket motor case produces gases which are controllably released through a nozzle to produce thrust for propelling the rocket motor. The propellant material is ignited for such use by an igniter system. However, each type of propellant material has an auto-ignition temperature, that is, a temperature at which the propellant will automatically ignite. The propellant material for a particular rocket motor is thus selected to have an auto-ignition temperature which is substantially greater than the ambient temperature range for storage and use of the rocket motor. If, due to an unexpected fire near a stored rocket motor, the propellant material in the rocket motor becomes so hot that it auto-ignites, not only may the fire hazard become increased but the rocket motor may become propulsive thus magnitudinally increasing the catastrophic damage which may occur. While such a danger of propulsion may not be as prevalent with other kinds of gas generators, it would still be desired to prevent catastrophic burst hazards from a high build up of pressure within them.

A large amount of energy is uneconomically required to sever the strands of fibrous material in a rocket motor case for venting thereof to reduce the effects of such a hazard by a shape charge or the like, which requires the introduction of an auxiliary system which uneconomically may have no function during normal operation. When exterior shaped charges, running along or wrapped around the case, or other auxiliary system is used to open the case or other pressure vessel additional expense and/or weight and possibly envelope as well may undesirably be required. Such an auxiliary system also increases the complexity and thereby reduces overall reliability in that there is one more element that can go wrong. Thus, it is desirable to have the option of achieving the objective of opening the case or other pressure vessel without the use of shaped charges or other auxiliary system at all.

Conventionally used metals do not lose strength at a low enough temperature. Strip-lap constructions (spiral laminated sheet configurations) lose strength in the adhesive between laminations; however, if the unintended heating is quite local, the strips may remain anchored at their ends with the result that the structure may undesirably continue to withstand pressure. Conventional filament wound vessels may upon heating behave similarly.

It is therefore an object of the present invention to provide a composite case for a rocket motor or other gas generator which is ventable at a temperature which is substantially above the ambient temperature range for storage and use thereof but which is substantially lower than the auto-ignition temperature of gas generant material therein so as to prevent catastrophic propulsion or burst of the case.

It is another object of the present invention to vent the case in a manner which is reliable and economical.

It is a further object of the present invention to achieve such venting without requiring any shaped charges or other auxiliary system for that purpose at all.

In order to provide such a ventable gas generator which requires no shaped charges or other auxiliary system at all, in accordance with the present invention the case is composed of a matrix-impregnated fibrous material wherein the fibrous material is characterized by having a melting point which is substantially higher than the ambient temperature range at which the gas generator is normally subjected and which is substantially lower than the temperature at which gas generant material in the case automatically ignites. The matrix material is preferably actinic radiation-curable at a temperature which is substantially lower than the melting point temperature of the fibrous material.

Other objects, features, and advantages of the present invention will become apparent in the following detailed description of the preferred embodiments thereof which should be read in connection with the accompanying drawings.

DETAILED DESCRIPTION OF THE PREFERRED EMBODIMENTS

Figure 1:
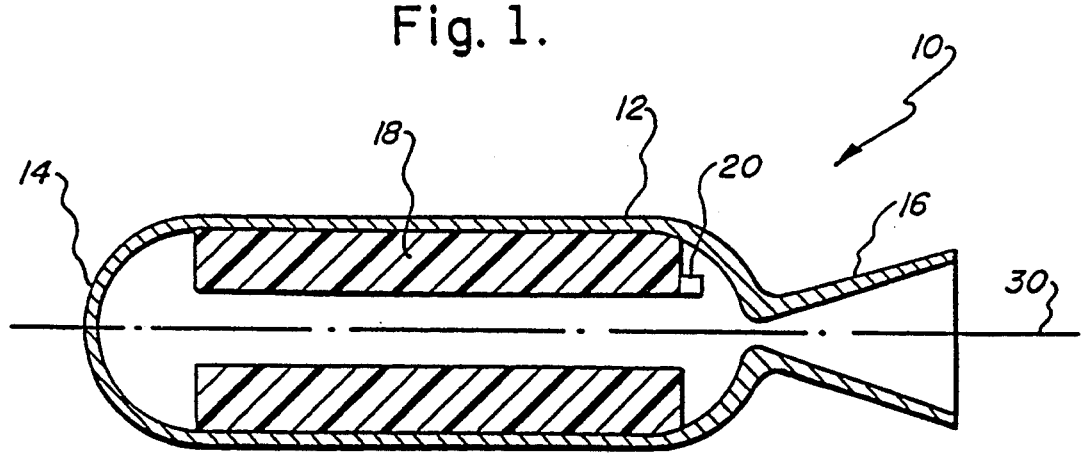
FIG. 1 is a generally schematic longitudinal section view of a rocket motor which embodies the present invention.

Referring to FIG. 1, there is illustrated generally at 10 a rocket motor which includes an elongate generally cylindrical case 12 which has a longitudinal axis 30. A domed member 14 is connected to the case 12 to close the forward end thereof, and the aft end is connected to a nozzle assembly 16 which may be of the converging-diverging type conventionally found in rocket motors. Contained within the case 12 is a suitable gas generant or solid propellant material 18 which may be attached to the inside wall of the case 12 with a suitable liner (not shown) and insulation material (not shown) interposed between the propellant material 18 and the case 12. The case 12, domed member 14, and nozzle 16 define a "pressure vessel" for the controlled release through the nozzle of gases from the combustion of the propellant material 18. While the propellant material 18 may be of any suitable type for the specific intended application, an example thereof may be found in U.S. Pat. No. 4,764,319 to Hightower, Jr. et al which is assigned to the assignee of the present invention and which patent is hereby incorporated herein by reference. For operation of the rocket motor 10, the propellant material 18 may be ignited by a suitable conventional igniter illustrated schematically at 20 to rapidly produce gases which pass through the narrow throat of the nozzle 16 creating thrust for propulsion thereof. The case 12 may be filament wound, or otherwise suitably prepared such as by braiding, on a mandrel, illustrated at 70 in FIG. 2, in accordance with principles commonly known to those of ordinary skill in the art to which this invention pertains and as described hereinafter and includes a plurality of plies of fibrous material strands 76 impregnated with a matrix material 90.

The ambient temperature range for storage and use of the rocket motor 10 may include temperatures up to perhaps 165 degrees Fahrenheit. The propellant material 18 may perhaps have an auto-ignition temperature, i.e., the temperature at which the propellant will automatically ignite, of perhaps 400 degrees Fahrenheit. In the event of a fire in the location where the rocket motor 10 is being stored, the temperature may conceivably reach the auto-ignition temperature such that the propellant material ignites. If the case 12 is not weakened to allow it to be burst or vented upon ignition of the propellant material, the only means of escape of the propellant gases is through the nozzle 16 with the results that the rocket motor 10 may catastrophically become propulsive. In order to prevent such a catastrophic propulsion of the rocket motor 10 from occurring in the event of a fire or the like, the case 12 is caused to weaken when subjected to a temperature intermediate the aforesaid ambient and auto-ignition temperatures so as to allow openings or vents to be formed therein to handle the outflow of combustion gases so that propulsive pressure rise is prevented if the propellant material 18 were to subsequently auto-ignite. In order to provide such venting wherein no shaped charges or other auxiliary system is required therefor at all, in accordance with the present invention the fibrous material 76 is a material which is characterized by having, in addition to sufficiently high strength for its intended use, a melting point intermediate the aforementioned ambient and auto-ignition temperatures wherein the yarn fraction of the composite membrane of the case 12 weakens as the melt point of the yarn 76 is approached but does not begin to weaken until it reaches a temperature substantially greater than the aforesaid ambient temperature range, and the yarn strength is lost when the melt point is reached. This intermediate temperature should be substantially above the ambient temperature range so that the case is not weakened prematurely but substantially below the propellant auto-ignition temperature so that the weakening of the case is effective. For the previously discussed ambient temperature range and auto-ignition temperature for the rocket motor 10, the fibrous material 76 may, for example, be polyolefin fiber, such as Spectra 1000 fibrous material distributed by the Fibers Division (Petersburg, Va.) of Allied Corporation of Morristown, N.J., which has a melting point of about 285 degrees Fahrenheit to allow the case 12 to weaken for venting thereof so that the rocket motor 10 does not become propulsive or a pressure vessel does not otherwise catastrophically burst upon the gas generant or propellant material 18 auto-igniting in the event of a fire. It should be understood that other fibrous materials having adequate strength, such as Spectra 900 polyethylene fibrous material also distributed by the Fibers Division of Allied Corporation, as determined in accordance with principles commonly known to those of ordinary skill in the art to which this invention pertains, and a suitable melting point in relation to the auto-ignition temperature of the gas generant material 18 and ambient temperature range are meant to come within the scope of the present invention, i.e., for an auto-ignition temperature of about 400 degrees Fahrenheit, a melting point within the range of about 200 to 300 degrees Fahrenheit may be suitable as long as the melting point is sufficiently higher than the ambient temperature range that the fiber is not weakened at ambient temperature. Thus, polyolefin fiber may be used for an ambient temperature range up to about 165 degrees Fahrenheit.

The use of polyolefin fiber and other suitable fiber having a melting point within the aforementioned melting point range limits the temperature at which the case 12 can be cured to substantially less than this melting point between about 200 and 300 degrees Fahrenheit. However, resins typically require cure at higher temperatures than this. In order to allow the case 12 to be cured at a sufficiently low temperature that the fibrous material 76 is not damaged, the matrix material 90 is one which is curable by actinic radiation such as, for example, ultraviolet light radiation, which does not appreciatively heat the matrix material being cured.

External insulation (not shown), frequently used in such rocket motors as protection of the case membrane from aerodynamic heating during flight, would also serve in the storage environment as a protection against unnecessary damage should a minor fire occur during storage. Use of such external insulation is generally predicated on a finding that aerodynamic heating is accommodated with lesser expenditures of weight and/or envelope through use of insulation than through an increase of the case membrane thickness in reflection of its loss of strength at elevated temperature; such insulation serves also as a protection against corrosion and against impact damage during handling.

Figure 2:
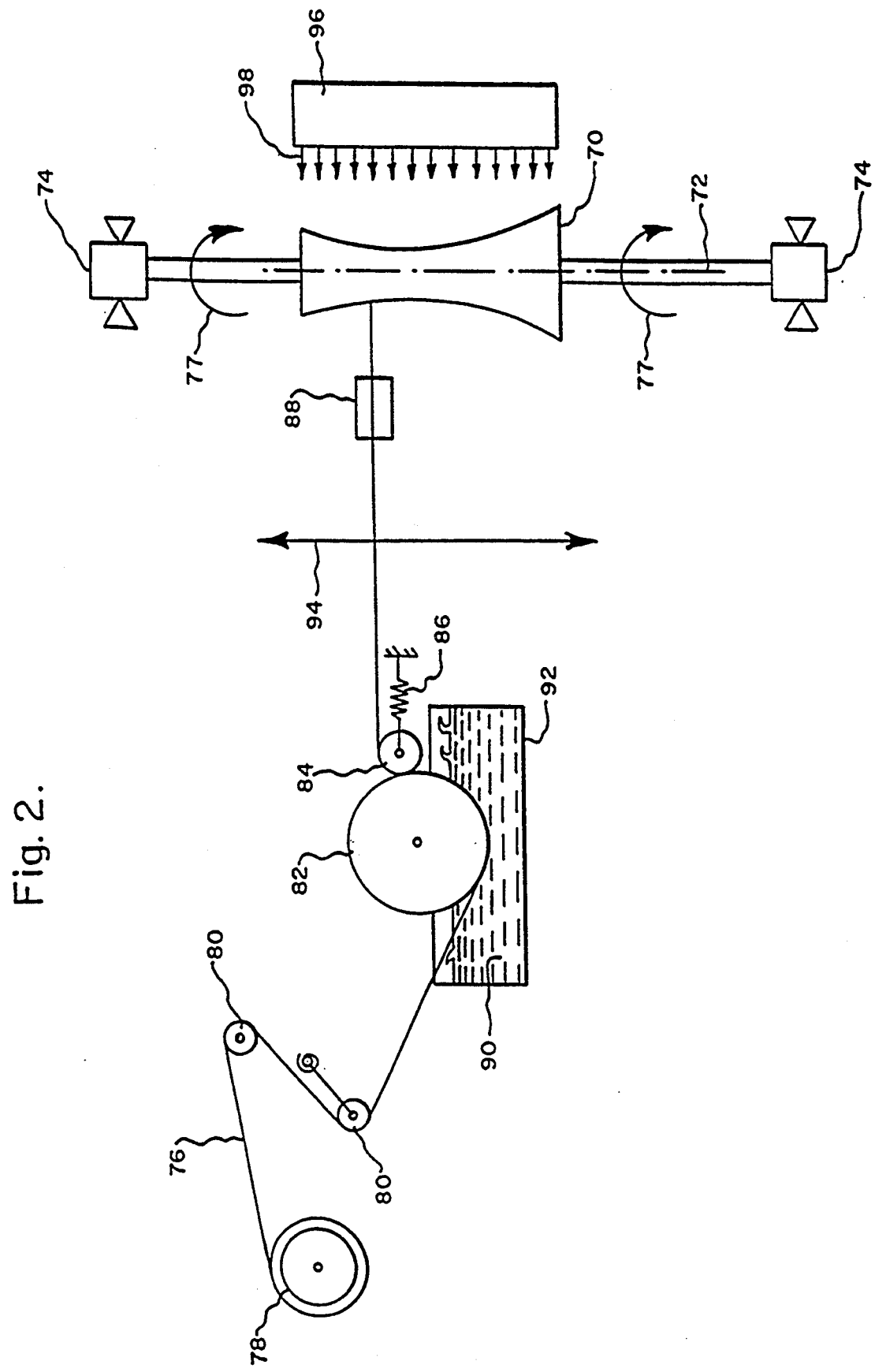
FIG. 2 is a schematic view illustrating a process for making the case for the rocket motor of FIG. 1 in accordance with the present invention.

Referring to FIG. 2, in order to wind rocket motor case 12 or other pressure vessel case, the mandrel 70 having the desired shape is suitably set on a rotatable shaft or axis 72 which is suitably supported by suitable supports 74 and rotated as indicated by arrows 77. The yarn or tows 76 of polyolefin fibers or other suitable fibrous material is let from a fiber spool 78 through or about suitable conventional tensioning devices 80 to the under portion of a suitable roll 82. The yarn 76 is routed between roll 82 and a smaller roll 84 to which tension is suitably applied as illustrated at 86 to a suitable conventional delivery head 88 from which the yarn 76 is applied onto the mandrel 70 as it rotates. The ultraviolet radiation or otherwise suitable actinic radiation curable matrix material 90 is contained within a container 92 in which the bottom portion of roller 82 is submerged as it rotates so that the matrix material 90 is applied to the yarn 76 as it is led along the under surface of the roll 82 and through the matrix bath 90. The delivery head 88 is movable, as illustrated at 94, parallel to the axis 72 for delivery of yarn 76 along the length of the mandrel 70 as it rotates. The speed of rotation of the mandrel 70 and of the delivery of yarn 76 and the speed of translation of delivery head 88 in the directions 94 are regulated in accordance with principles commonly known to one of ordinary skill in the art to which this invention pertains to filament wind or otherwise suitably apply the yarn 76 onto the mandrel 70 in accordance with principles commonly known to those of ordinary skill in the art to which this invention pertains.

As the yarn 76 is applied to the mandrel 70 it is subjected to radiation, illustrated at 98, from a suitable source 96 of actinic radiation such as ultraviolet radiation to immediately at least partially cure the matrix material 90 or to initiate its cure to anchor the yarn 76 in the desired position. The particular dosage of radiation 98 may be selected in accordance with principles commonly known to those of ordinary skill in the art to which this invention pertains to achieve sufficient and timely curing of the matrix material 90.

The matrix material 90 may suitably comprise an actinic radiation curable first resin component and a second resin component which is subsequently cured after actinic radiation curing of the first resin component and thus is non-cured under actinic radiation conditions effective for curing of the first resin component, as disclosed in U.S. Pat. No. 4,892,764 to Drain et al which is assigned to Loctite Corporation and which is hereby incorporated herein by reference. As discussed therein, the first resin component may comprise any suitable resin which under actinic radiation conditions may be cured to such extent as to immobilize the resulting partially cured mass of the composition comprising the first and second resin components, i.e., spatially fix the location of the partially cured composition mass so that it does not migrate during the subsequent cure of the second resin component and thereby cause the yarn 76 to be anchored in position. The second resin component may or may not be so curable depending on the cure and resin composition desired. However, if both first and second resins are actinic radiation curable, the second resin component is non-curable under actinic radiation conditions which are effective for curing the first resin component. Accordingly, photoinitiators may be added to the composition in an amount effective to respond to the actinic radiation and to initiate an induced curing of the associated resin via substantial polymerization thereof. The second resin component of the composition may be any suitable resin which is compatible with the composition and which upon cure provides the desired physical and performance characteristics such as strength in the final article, which characteristics may be determined in accordance with principles commonly known to those of ordinary skill in the art to which this invention pertains. Thus, the second resin component may be curable over a long period of time under ambient temperature or other suitable conditions of cure commonly known in the art. It should be understood, however, that the present invention is not limited to this type of matrix material and that any suitable actinic radiation-curable matrix material which provides the desired physical and performance properties is meant to come within the scope of the present invention. Carbon black in a suitable quantity may be added to the matrix material 90 to make it opaque so that bubbles may be eliminated from sight in the matrix material.

The case 12 may, if desired, be filament wound or otherwise suitably applied directly onto the solid gas generant material 18 in which event the cast gas generant material 18 may be suitably mounted on supports 74 for rotation and application of fibrous material 76 similarly as described for application of fibrous material onto mandrel 70 in FIG. 2, the winding tension being determined in accordance with principles commonly known to those of ordinary skill in the art to which this invention pertains.

Thus, by providing for a rocket motor or other gas generator case a suitable low melting point fibrous material impregnated with a suitable matrix material which is curable by actinic radiation so that the fibrous material is not melted during the cure process, the rocket motor or other gas generator may, without requiring any shaped charges or other auxiliary system at all, be caused to lose the capability to withstand internal pressure at a temperature lower than the auto-ignition temperature of solid propellant or other gas generant material contained therein so as to prevent catastrophic propulsion or burst in case of fire.

It is to be understood that the invention is by no means limited to the specific embodiments which have been illustrated and described herein and that various modifications thereof may indeed be made which come within the scope of the present invention as defined by the appended claims.

What is claimed is:

1. A gas generator comprising a case composed of fibrous material impregnated with a matrix material and further comprising gas generant material disposed within said case, said gas generate material characterized in automatically igniting when subjected to a temperature that is substantially higher than the ambient temperature range at which the gas generator is normally subjected, said fibrous material characterized by having a melting point which is substantially higher than said ambient temperature range and which is substantially lower than said temperature at which said gas generant material automatically ignites, and said case having capability to withstand internal pressure at a temperature lower than the autoignition temperature of said gas generant material during controlled burning of said gas generant material.

2. A gas generator according to claim 1 wherein said matrix material is ultraviolet light-curable.

3. A gas generator according to claim 1 wherein the gas generator is a rocket motor.

4. A gas generator according to claim 1 wherein said fibrous material is composed of polyolefin fiber.

5. The gas generator of claim 1 wherein said ambient temperature is less than 165° F.

6. The gas generator of claim 1 wherein said case is ventable by melting of said fibrous material.

7. A gas generator according to claim 1 wherein said matrix material is actinic radiation-curable at a temperature which is substantially lower than said melting point temperature of said fibrous material.

8. A gas generator according to claim 7 wherein said fibrous material is composed of polyolefin fiber.

9. A rocket motor comprising a case composed of fibrous material impregnated with a matrix material and further comprising solid propellant material disposed within said case, said solid propellant material characterized in automatically igniting when subjected to a temperature which is greater than about 400 degrees Fahrenheit, said fibrous material characterized in having a melting point which is less than about 300 degrees Fahrenheit and which is substantially greater than the ambient temperature range at which the rocket motor is normally subjected, and said case having capability to withstand pressure at a temperature lower than the auto-ignition temperature of said solid propellant material during use of the rocket motor.

10. A rocket motor according to claim 9 wherein said matrix material is ultraviolet light-curable.

11. A rocket motor according to claim 9 wherein said fibrous material is composed of polyolefin fiber.

12. The rocket motor of claim 9 wherein said ambient temperature is less than 165° F.

13. The rocket motor of claim 9 wherein said case is ventable by melting of said fibrous material.

14. A rocket motor according to claim 9 wherein said matrix material is actinic radiation-curable at a temperature which is substantially lower than said melting point temperature of said fibrous material.

15. A rocket motor according to claim 14 wherein said fibrous material is composed of polyolefin fiber.

16. A method for making a gas generator comprising providing a gas generant material which is characterized in automatically igniting when subjected to a temperature that is substantially higher than the ambient temperature range to which the gas generator is normally subjected, preparing a case of fibrous material impregnated with a matrix material and characterized in having a melting point which is substantially higher than said ambient temperature range and which is substantially lower than said temperature at which the gas generant material automatically ignites, curing the matrix material at a temperature which is substantially lower than the melting point temperature of the fibrous material, and disposing the gas generant material within the case, and said case having capability to withstand internal pressure at a temperature lower than the auto-ignition temperature of said gas generant material during controlled burning of said gas generant material.

17. A method according to claim 16 further comprising the steps of selecting the gas generant material to be a solid propellant material and filament winding the case about the solid propellant material.

18. A method according to claim 16 wherein the step of curing the matrix material comprises subjecting the matrix material to ultraviolet light.

19. A method according to claim 16 wherein the gas generator is a rocket motor.

20. A method according to claim 16 further comprising selecting the fibrous material to be polyolefin fiber.

21. A method according to claim 16 wherein the step of preparing the case comprises filament winding the fibrous material.

22. The method of claim 16 wherein said ambient temperature is less than 165° F.

23. The method of claim 16 comprising the additional step of venting said case by melting said fibrous material.

24. A method according to claim 16 wherein the step of curing the matrix material comprises subjecting the matrix material to actinic radiation.

25. A method according to claim 24 further comprising selecting the fibrous material to be polyolefin fiber.

26. A method according to claim 16 wherein the gas generator is a rocket motor and said temperature at which the gas generant material automatically ignites is greater than about 400 degrees Fahrenheit, the method further comprising selecting the fibrous material to have a melting point which is less than about 300 degrees Fahrenheit and which is substantially greater than the ambient temperature range at which the rocket motor is normally subjected.

27. A method according to claim 26 further comprising selecting the fibrous material to be polyolefin fiber.

* * * * *